US011904687B2

(12) United States Patent
Arai (10) Patent No.: US 11,904,687 B2
(45) Date of Patent: Feb. 20, 2024

(54) VEHICLE CONTROL APPARATUS (71) Applicant: SUBARU CORPORATION, Tokyo (JP)

(72) Inventor: Shoto Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 274 days.

(21) Appl. No.: 17/534,083

(22) Filed: Nov. 23, 2021

(65) Prior Publication Data

US 2022/0176816 A1 Jun. 9, 2022

(30) Foreign Application Priority Data

Dec. 9, 2020 (JP) .................. 2020-203815

(51) Int. Cl.
*B60K 31/00* (2006.01)
*B60L 15/20* (2006.01)
(52) U.S. Cl.
CPC .......... *B60K 31/0008* (2013.01); *B60L 15/20* (2013.01); *B60K 2031/0033* (2013.01); *B60K 2031/0091* (2013.01); *B60L 2240/12* (2013.01); *B60L 2240/42* (2013.01); *B60L 2240/423* (2013.01); *B60L 2240/68* (2013.01); *B60L 2250/26* (2013.01)
(58) Field of Classification Search
None
See application file for complete search history.

(56) References Cited

U.S. PATENT DOCUMENTS

| | | | | |
|---|---|---|---|---|
| 6,591,178 B2* | 7/2003 | Krueger | .................. | B60T 8/171 701/84 |
| 9,395,383 B2* | 7/2016 | Championnet | ....... | B60C 23/062 |
| 2016/0250946 A1 | 9/2016 | Niimi et al. | | |
| 2019/0111914 A1* | 4/2019 | Lim | ........................ | B60K 6/387 |
| 2019/0225218 A1* | 7/2019 | Ishikawa | ............... | B60W 40/06 |

FOREIGN PATENT DOCUMENTS

JP 6036639 B2 11/2016

\* cited by examiner

*Primary Examiner* — Adam D Tissot
*Assistant Examiner* — Garrett F Evans
(74) *Attorney, Agent, or Firm* — Rimon P.C.

(57) ABSTRACT

A vehicle control apparatus configured to control a driving motor coupled to at least one wheel includes a motor controller, a vehicle speed calculator, and a vehicle speed setter. The motor controller controls the driving motor in a constant speed driving mode. The vehicle speed calculator calculates a first vehicle speed based on a rotation angle of the driving motor. The vehicle speed setter sets, as a driving speed in the constant speed driving mode, a second vehicle speed based on the first vehicle speed and a brake operation amount. The vehicle speed setter sets zero as the second vehicle speed when the brake operation amount exceeds its threshold and the first vehicle speed falls below its threshold, and sets the first vehicle speed as the second vehicle speed when the brake operation amount does not exceed its threshold r the first vehicle speed does not fall below its.

5 Claims, 7 Drawing Sheets

VEHICLE CONTROL APPARATUS

CROSS-REFERENCE TO RELATED APPLICATIONS

The present application claims priority from Japanese Patent Application No. 2020-203815 filed on Dec. 9, 2020, the entire contents of which are hereby incorporated by reference.

BACKGROUND

The disclosure relates to a vehicle control apparatus configured to control a driving motor coupled to wheels.

A driving motor coupled to wheels is mounted in vehicles such as electric vehicles and hybrid electric vehicles (see Japanese Patent No. 6036639). The driving motor includes a rotation angle sensor such as a resolver. In many cases, the driving speed of a vehicle including the driving motor is calculated using an output signal of the rotation angle sensor.

SUMMARY

An aspect of the disclosure provides a vehicle control apparatus to be applied to a vehicle. The vehicle control apparatus is configured to control a driving motor of the vehicle coupled to at least one wheel of the vehicle. The vehicle control apparatus includes a motor controller, a vehicle speed calculator, and a vehicle speed setter. The motor controller is configured control the driving motor upon executing a constant speed driving mode of maintaining a driving speed of the vehicle constant in a very low speed range. The vehicle speed calculator is configured to calculate a first vehicle speed based on a rotation angle of the driving motor. The first vehicle speed is the driving speed of the vehicle. The vehicle speed setter is configured to set, as the driving speed of the vehicle used in the constant speed driving mode, a second vehicle speed based on the first vehicle speed and a brake operation amount. The vehicle speed setter is configured to set zero as the second vehicle speed in a case where the brake operation amount exceeds a brake operation threshold and the first vehicle speed falls below a vehicle speed threshold during execution of the constant speed driving mode, and sets the first vehicle speed as the second vehicle speed in a case where the brake operation amount is less than or equal to the brake operation threshold or the first vehicle speed is greater than or equal to the vehicle speed threshold during execution of the constant speed driving mode.

An aspect of the disclosure provides a vehicle control apparatus to be applied to a vehicle. The vehicle control apparatus is configured to control a driving motor of the vehicle coupled to at least one wheel of the vehicle. The vehicle control apparatus includes circuitry. The circuitry is configured to control the driving motor upon executing a constant speed driving mode of maintaining a driving speed of the vehicle constant in a very low speed range. The circuitry is configured to calculate a first vehicle speed based on a rotation angle of the driving motor. The first vehicle speed is the driving speed of the vehicle. The circuitry is configured to set, as the driving speed of the vehicle used in the constant speed driving mode, a second vehicle speed based on the first vehicle speed and a brake operation amount. The circuitry is configured to set zero as the second vehicle speed in a case where the brake operation amount exceeds a brake operation threshold and the first vehicle speed falls below a vehicle speed threshold during execution of the constant speed driving mode, and set the first vehicle speed as the second vehicle speed in a case where the brake operation amount is less than or equal to the brake operation threshold or the first vehicle speed is greater than or equal to the vehicle speed threshold during execution of the constant speed driving mode.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

A driving motor mounted in vehicles has a high-resolution rotation angle sensor. Thus, if the driving speed of the vehicle is calculated using an output signal of the rotation angle sensor, the driving speed upon a vehicle stop may be calculated, for a moment, in the reverse direction. That is, because there is play between wheels and the driving motor, a rotor of the driving motor may flip by the amount of play upon a vehicle stop, i.e., the rotor may flip in the reverse direction by the amount of play immediately after the rotation speed of the rotor reaches zero. In this case, even if the vehicle is not moving in reverse, a controller or the like may recognize that the vehicle is moving in reverse. There is room for improvement in that there is a possibility of erroneous determination of reverse vehicle movement by the controller or the like.

It is desirable to avoid erroneous determination of reverse vehicle movement.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle Configuration

Figure 1:
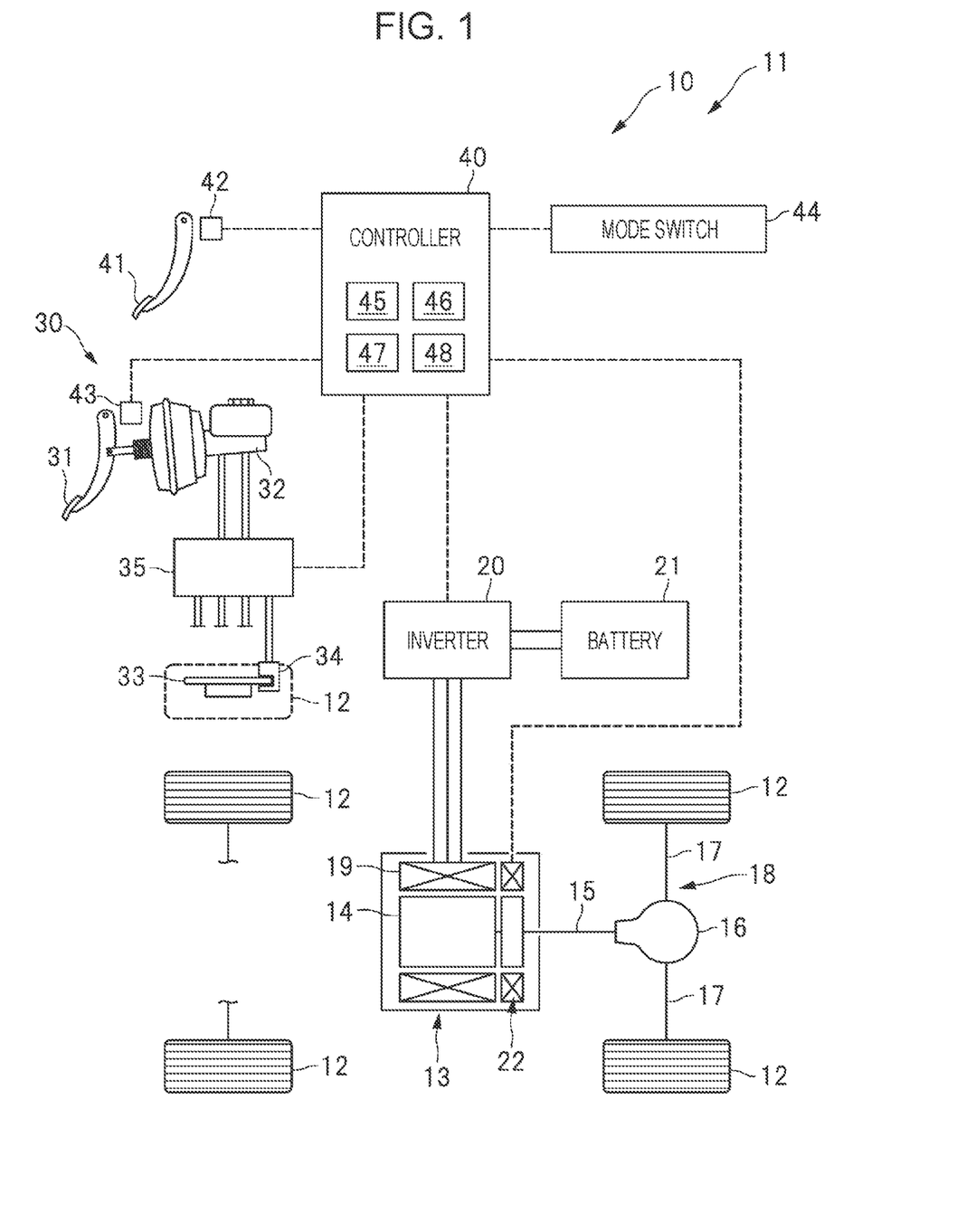
FIG. 1 is a diagram illustrating an exemplary configuration of a vehicle with a vehicle control apparatus according to an embodiment of the disclosure.

FIG. 1 is a diagram illustrating an exemplary configuration of a vehicle 11 including a vehicle control apparatus 10 according to the embodiment of the disclosure. As illustrated in FIG. 1, the vehicle 11 includes a driving motor 13 coupled to wheels 12. The wheels 12 are each coupled to a rotor 14 of the driving motor 13 via a power transmission path 18 including a motor output shaft 15, a differential mechanism 16, and a wheel drive shaft 17. In one example, the differential mechanism 16 may serve as a "gear mechanism". In addition, an inverter 20, which is a power converter, is coupled to a stator 19 of the driving motor 13. A battery 21, such as a lithium ion battery, is coupled to the inverter 20. The driving motor 13 further includes a rotation angle sensor 22, such as a resolver, configured to detect the rotation angle of the rotor 14.

The vehicle 11 also includes a brake 30 configured to brake the wheels 12. The brake 30 includes a master cylinder 32 coupled to a brake pedal 31, calipers 34 configured to brake disc rotors 33 of the wheels 12, and an actuator 35 configured to control a brake fluid pressure supplied to each of the calipers 34. When the driver steps on the brake pedal 31, a brake fluid pressure is transmitted from the master cylinder 32 to the calipers 34 via the actuator 35, and the calipers 34 brake the disc rotors 33 of the wheels 12. Note that the illustrated vehicle 11 may be a front-wheel drive vehicle configured to drive the front wheels by the driving motor 13, a back-wheel drive vehicle configured to drive the back wheels by the driving motor 13, or an all-wheel drive vehicle configured to drive the front and back wheels by the driving motor 13.

The vehicle control apparatus 10 mounted in the vehicle 11 includes a controller 40 including a microcomputer or the like. An accelerator sensor 42 configured to detect the depressed amount of an accelerator pedal 41 and a brake sensor 43 configured to detect the depressed amount (hereinafter referred to as a brake operation amount Bs) of the brake pedal 31 are coupled to the controller 40. In addition, the above-described rotation angle sensor 22 configured to detect the rotation angle of the driving motor 13 and a mode switch 44 to be operated when executing a later-described low speed driving mode are coupled to the controller 40.

The controller 40 also includes a vehicle speed calculator 45 configured to calculate a sensor actual vehicle speed V1, which is the driving speed of the vehicle 11, and a vehicle speed setter 46 configured to set a control actual vehicle speed V2 on the basis of the sensor actual vehicle speed V1. In one example, the sensor actual vehicle speed V1 may serve as a "first vehicle speed". In one example, the control actual vehicle speed V2 may serve as a "second vehicle speed". The vehicle speed calculator 45 of the controller 40 calculates the sensor actual vehicle speed V1, which is the driving speed while driving, on the basis of the rotation angle of the driving motor 13 detected by the rotation angle sensor 22. Under later-described vehicle speed correction control, the vehicle speed setter 46 of the controller 40 sets, as the driving speed while driving used in a later-described very low speed mode, the control actual vehicle speed V2 based on the brake operation amount Bs detected by the brake sensor 43 and the sensor actual vehicle speed V1 calculated by the vehicle speed calculator 45. The controller 40 further includes a motor controller 47 configured to control the driving motor 13 via the inverter 20 and a brake controller 48 configured to control the brake 30 via the actuator 35.

Very Low Speed Mode

The vehicle control apparatus 10 has the very low speed mode, which is referred to as low-speed cruise control or the like, as a driving mode of the vehicle 11. In one example, the very low speed mode may serve as a "constant speed driving mode". This very low speed mode is a mode where the driving speed of the vehicle 11 is maintained constant in a very low speed range (such as less than or equal to 10 km/h). In response to selection of the very low speed mode by a switch operation performed by the driver, the motor controller 47 of the controller 40 controls the driving motor 13 so as to maintain the driving speed of the vehicle 11 constant. With the very low speed mode being executed, the driver may concentrate on the operation of the steering wheel and drive on a rough road such as a rocky road without performing an accelerator operation or a brake operation. As described above, the control actual vehicle speed V2 is used as the driving speed of the vehicle 11 in the very low speed mode.

Execution Procedure of Vehicle Speed Correction Control

Figure 2:
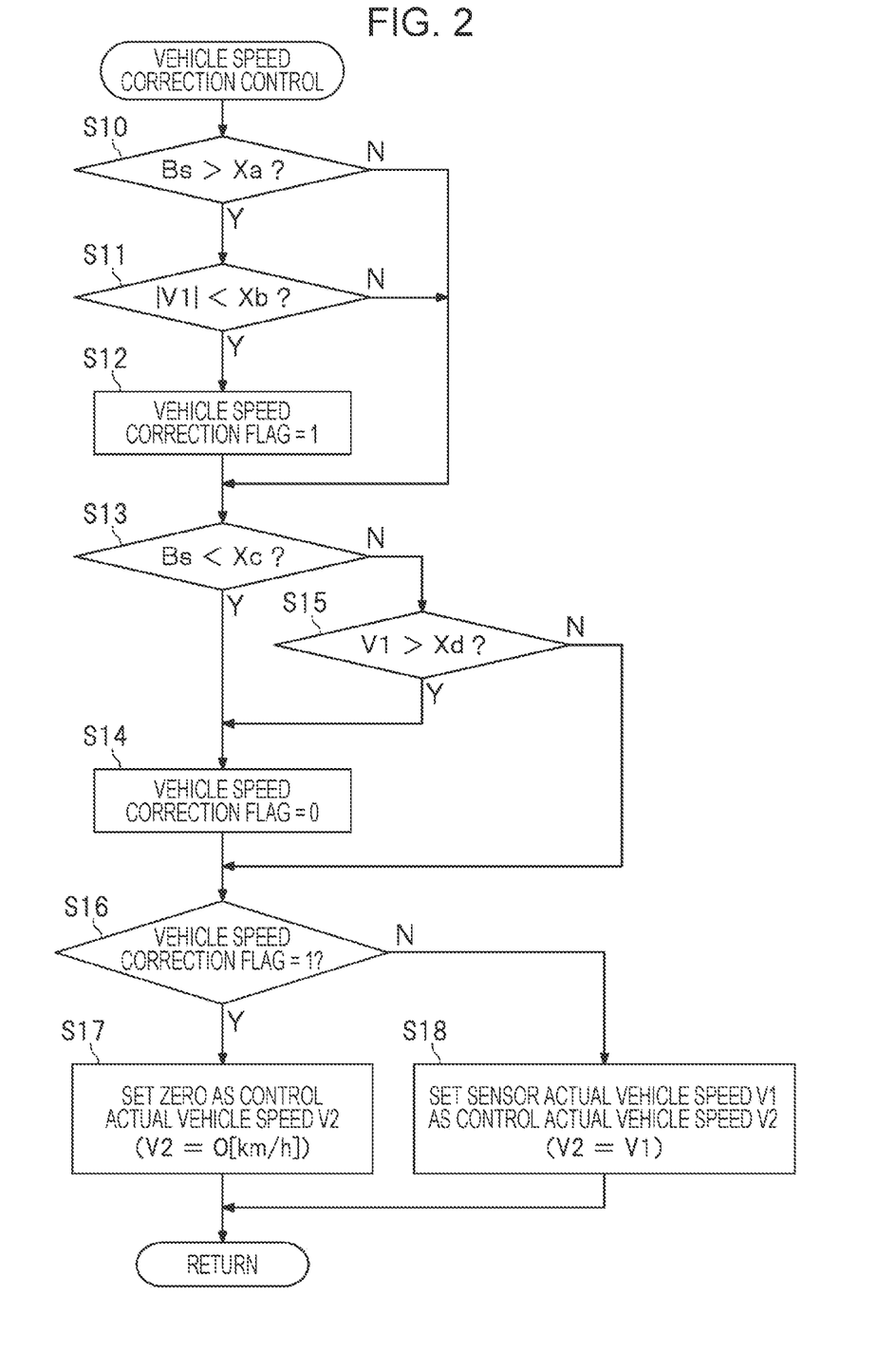
FIG. 2 is a flowchart illustrating an example of the execution procedure of vehicle speed correction control performed by a controller.

Hereinafter, the execution procedure of vehicle speed correction control, which is executed along with the very low speed mode, will be described. After that, the execution procedure of the very low speed mode will be described. FIG. 2 is a flowchart illustrating an example of the execution procedure of vehicle speed correction control performed by the controller 40.

As illustrated in FIG. 2, in step S10, it is determined whether the brake operation amount Bs exceeds a certain threshold Xa. If it is determined in step S10 that the brake operation amount Bs exceeds the threshold Xa, the procedure proceeds to step S11, and it is determined whether the absolute value of the sensor actual vehicle speed V1 falls below a certain threshold Xb (such as 1 km/h). If it is determined in step S11 that the absolute value of the sensor actual vehicle speed V1 falls below the threshold Xb, the procedure proceeds to step S12, and a vehicle speed correction flag is set to "1". In short, if the brake pedal 31 is depressed and the vehicle 11 is immediately before stopping, the procedure proceeds to step S12, and the vehicle speed correction flag is set to "1".

Next in step S13, it is determined whether the brake operation amount Bs falls below a certain threshold Xc. If it is determined in step S10 or S11 described above that the brake operation amount Bs is less than or equal to the threshold Xa or the absolute value of the sensor actual vehicle speed V1 is greater than or equal to the threshold Xb, the procedure bypasses step S12 and proceeds to step S13, and it is determined whether the brake operation amount Bs falls below the threshold Xc. If it is determined in step S13 that the brake operation amount Bs falls below the threshold Xc, the procedure proceeds to step S14, and the vehicle speed correction flag is set to "0". In contrast, if it is determined in step S13 that the brake operation amount Bs is greater than or equal to the threshold Xc, the procedure proceeds to step S15, and it is determined whether the sensor actual vehicle speed V1 exceeds a certain threshold Xd. If it is determined in step S15 that the sensor actual vehicle speed V1 exceeds the threshold Xd, the procedure proceeds to step S14, and the vehicle speed correction flag is set to "0". In this manner, if the brake pedal 31 is released or the vehicle 11 is driving without stopping, the procedure proceeds to step S14, and the vehicle speed correction flag is set to "0".

Next in step S16, it is determined whether the vehicle speed correction flag is "1". If it is determined in steps S13 and S15 described above that the brake operation amount Bs is greater than or equal to the threshold Xc and the sensor actual vehicle speed V1 is less than or equal to the threshold Xd, the procedure bypasses step S14 and proceeds to step S16, and it is determined whether the vehicle speed correction flag is "1". If it is determined in step S16 that the vehicle speed correction flag is "1", that is, if the brake pedal 31 is depressed and the vehicle 11 is immediately before stopping, the procedure proceeds to step S17, and zero (0 km/h) is set as the control actual vehicle speed V2. In contrast, if it is determined in step S16 that the vehicle speed correction flag is "0", that is, if the brake pedal 31 is released or the vehicle 11 is driving without stopping, the procedure proceeds to step S18, and the sensor actual vehicle speed V1 is set as it is as the control actual vehicle speed V2.

Figure 3:
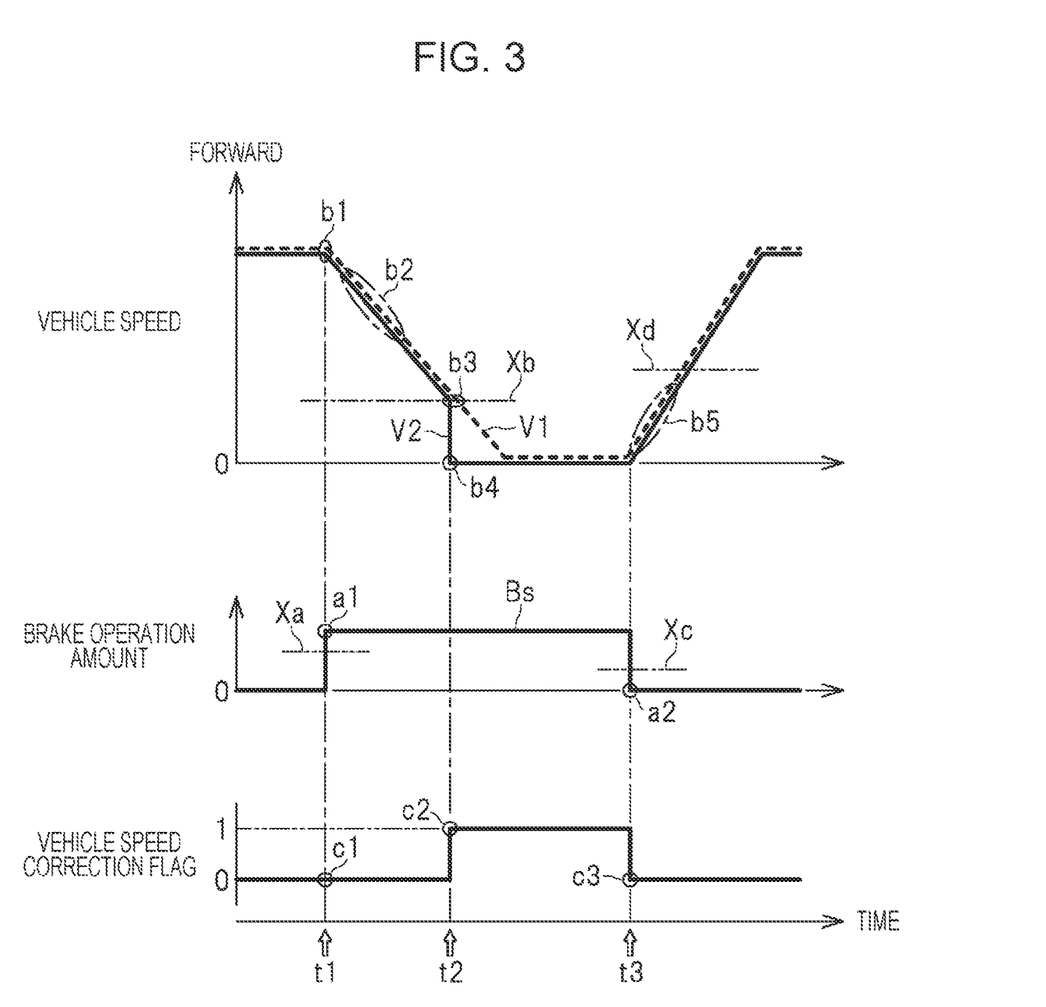
FIG. 3 is a timing chart illustrating an example of the execution status of vehicle speed correction control.

FIG. 3 is a timing chart illustrating an example of the execution status of vehicle speed correction control. In FIG. 3, the sensor actual vehicle speed V1 is indicated by broken line, and the control actual vehicle speed V2 is indicated by solid line. As indicated at time t1 in FIG. 3, when the driver steps on the brake pedal 31, the brake operation amount Bs exceeds the threshold a (reference symbol a1). At this time t1, because the sensor actual vehicle speed V1 exceeds the threshold Xb (reference symbol b1), the vehicle speed correction flag is set to "0" (reference symbol c1), and the sensor actual vehicle speed V1 is set as the control actual vehicle speed V2 (reference symbol b2).

Next, as indicated at time t2, when the sensor actual vehicle speed V1 decreases and falls below the threshold Xb (reference symbol b3), the vehicle speed correction flag is set to "1" (reference symbol c2). In this manner, in response to setting of the vehicle speed correction flag to "1", zero (0 km/h) is set as the control actual vehicle speed V2 (reference symbol b4). As indicated at time t3, when the driver releases the brake pedal 31 and the brake operation amount Bs falls below the threshold Xc (reference symbol a2), the vehicle speed correction flag is set to "0" (reference symbol c3), and the sensor actual vehicle speed V1 is set as the control actual vehicle speed V2 (reference symbol b5).

Execution Procedure of Very Low Speed Mode

Figure 4:
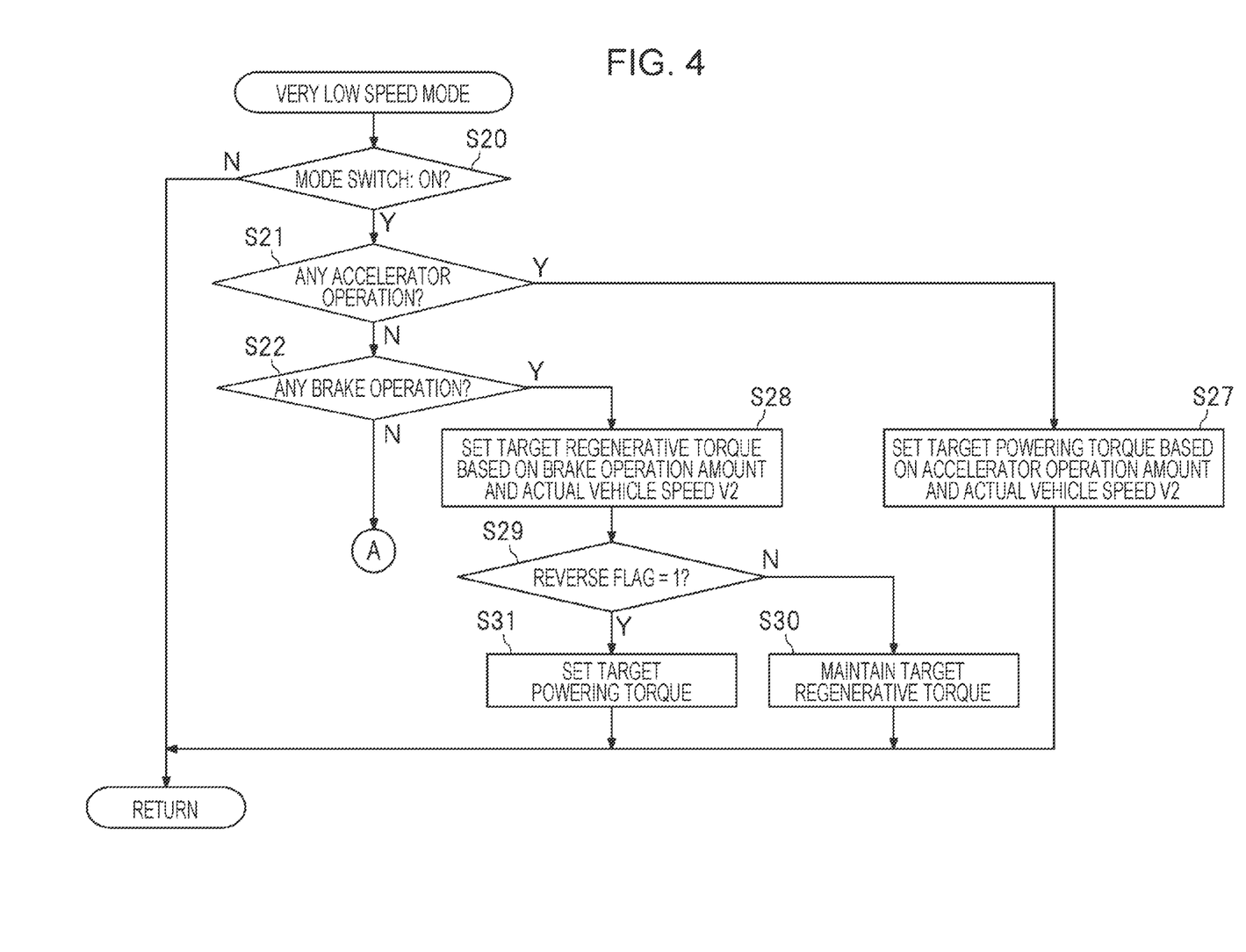
FIG. 4 is a flowchart illustrating an example of the execution procedure of a very low speed mode performed by the controller.
Figure 5:
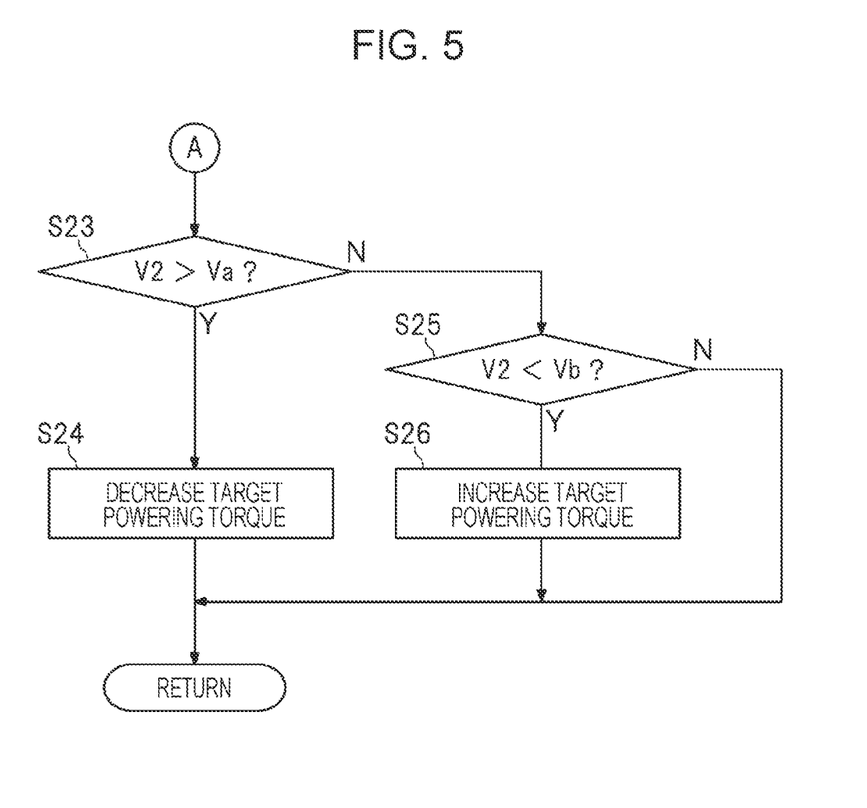
FIG. 5 is a flowchart illustrating an example of the execution procedure of the very low speed mode performed by the controller.

Next, the execution procedure of the very low speed mode of maintaining the driving speed constant in the very low speed range will be described. FIGS. 4 and 5 are flowcharts illustrating an example of the execution procedure of the very low speed mode performed by the controller 40. Note that the flowcharts illustrated in FIGS. 4 and 5 are connected with each other at reference symbol A.

As illustrated in FIG. 4, in step S20, it is determined whether the driver has turned on the mode switch 44. If it is determined in step S20 that the driver has turned on the mode switch 44, the procedure proceeds to step S21, and it is determined whether the driver has performed an accelerator operation. The procedure proceeds to step S22, and it is determined whether the driver has performed a brake operation. If it is determined in steps S21 and S22 that the driver has performed neither an accelerator operation nor a brake operation, the procedure proceeds to step S23, as illustrated in FIG. 5.

In step S23, it is determined whether the control actual vehicle speed V2 exceeds a certain upper limit Va. The upper limit Va, which is compared with the control actual vehicle speed V2, is a value obtained by adding a certain value to a target speed in the very low speed mode. If it is determined in step S23 that the control actual vehicle speed V2 exceeds the upper limit Va, the procedure proceeds to step S24, a target powering torque of the driving motor 13 is decreased, and the driving motor 13 is controlled on the basis of this target powering torque. In contrast, if it is determined in step S23 that the control actual vehicle speed V2 is less than or equal to the upper limit Va, the procedure proceeds to step S25, and it is determined whether the control actual vehicle speed V2 falls below a certain lower limit Vb. The lower limit Vb, which is compared with the control actual vehicle speed V2, is a value obtained by subtracting a certain value from the target speed in the very low speed mode. If it is determined in step S25 that the control actual vehicle speed V2 falls below the lower limit Vb, the procedure proceeds to step S26, the target powering torque of the driving motor 13 is increased, and the driving motor 13 is controlled on the basis of this target powering torque. In this manner, by increasing or decreasing the target powering torque of the driving motor 13, the driving motor 13 is controlled so as to maintain the target speed between the upper limit Va and the lower limit Vb even if neither an accelerator operation nor a brake operation is performed in the very low speed mode.

If an accelerator operation or a brake operation is performed in the very low speed mode, the driving motor 13 is controlled on the basis of the accelerator operation or the brake operation. As illustrated in FIG. 4, if it is determined in step S21 that an accelerator operation is being performed, the procedure proceeds to step S27, the target powering torque is set on the basis of the accelerator operation amount and the control actual vehicle speed V2, and the driving motor 13 is controlled on the basis of this target powering torque. In this manner, if the accelerator pedal 41 is depressed during execution of the very low speed mode where the vehicle 11 slowly drives forward, the target powering torque is increased to accelerate the vehicle 11.

If it is determined in step S22 that a brake operation is being performed, the procedure proceeds to step S28, and a target regenerative torque is set on the basis of the brake operation amount Bs and the control actual vehicle speed V2. Next in step S29, it is determined whether a reverse flag is "1". Here, the reverse flag is a flag indicating reverse vehicle movement. The reverse flag is set to "1" upon reverse vehicle movement, and the reverse flag is set to "0" upon forward vehicle movement. If it is determined in step S29 that the reverse flag is "0", that is, if the vehicle 11 is moving forward, the procedure proceeds to step S30, the target regenerative torque set in step S28 is maintained, and the driving motor 13 is controlled on the basis of this target regenerative torque. In contrast, if it is determined in step S29 that the reverse flag is "1", that is, if the vehicle 11 is moving in reverse, the procedure proceeds to step S31, the target powering torque is set instead of the target regenerative torque, and the driving motor 13 is controlled on the basis of this target powering torque.

In this manner, if the brake pedal 31 is depressed in the very low speed mode where the vehicle 11 slowly drives forward, the target torque is switched from the target powering torque to the target regenerative torque to decelerate the vehicle 11. If it is determined in step S29 that the reverse flag is "1", that is, if reverse vehicle movement is detected in the very low speed mode, the vehicle 11 is assumed to slide down on an uphill or the like. Thus, the target torque of the driving motor 13 is increased in the forward direction and in the powering direction. That is, if the control actual vehicle speed V2 changes from forward to reverse during execution of the very low speed mode, the target torque of the driving motor 13 is set to a value larger than the latest value in the forward direction and in the powering direction. In doing so, thrust in the forward direction may be applied from the driving motor 13 to the wheels 12, thereby preventing the vehicle 11 from sliding down.

As indicated in steps S25 and S26, if the control actual vehicle speed V2 falls below the lower limit Vb in the very low speed mode, the target powering torque of the driving motor 13 is increased. In this case, the more the control actual vehicle speed V2 decreases from a certain target speed, the greater the target powering torque of the driving motor 13 is set. In short, even when the brake pedal 31 is not depressed, if the control actual vehicle speed V2 decreases toward zero on an uphill or the like during execution of the very low speed mode and the control actual vehicle speed V2 changes from forward to reverse, thrust in the forward direction is applied from the driving motor 13 to the wheels 12, thereby preventing reverse vehicle movement. Thus, the target torque of the driving motor 13 is set to be greater than the latest value in the forward direction and in the powering direction.

Motor Rotation Status when Braking Control is Performed on Vehicle

Figure 6A:
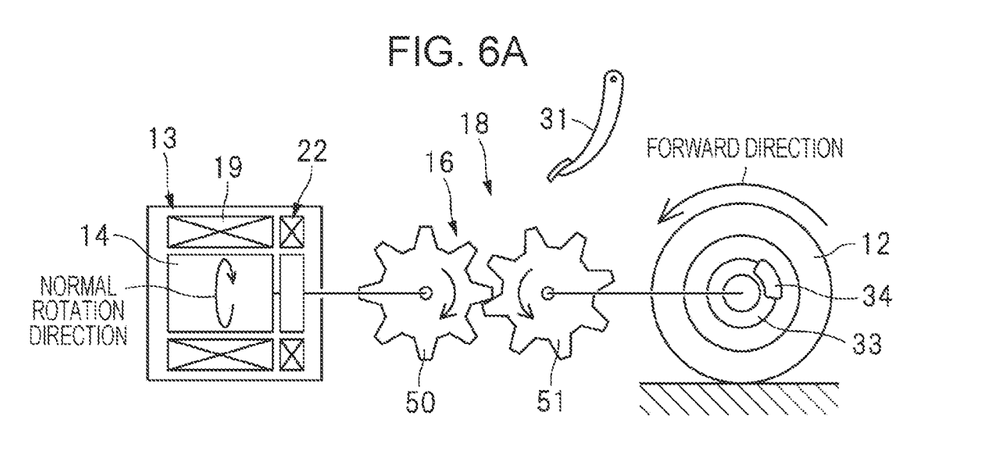
FIGS. 6A to 6C are images illustrating the rotation status of the driving motor when braking control is performed on the vehicle in the very low speed mode.
Figure 6B:
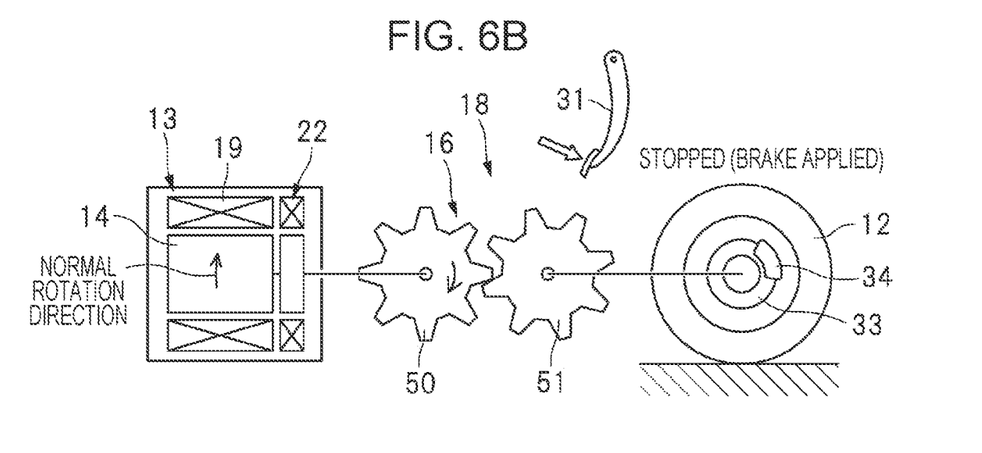
Figure 6C:
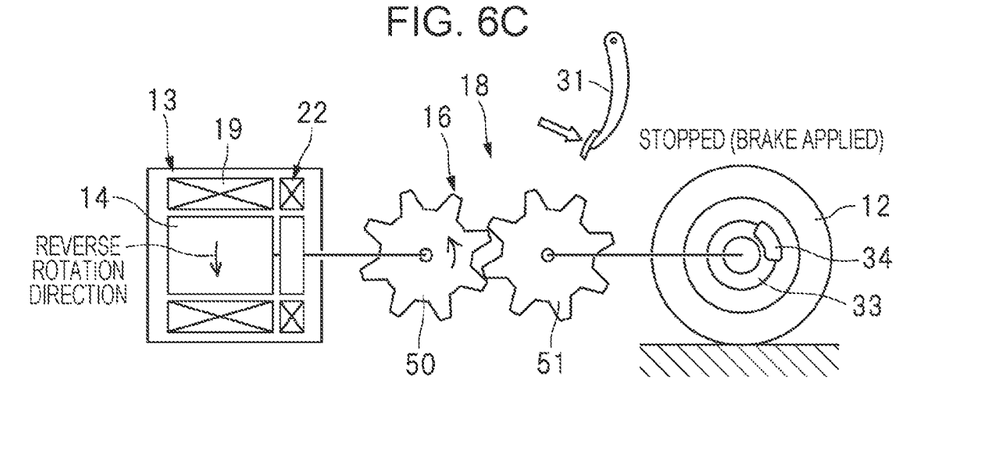

As described above, the control actual vehicle speed V2, not the sensor actual vehicle speed V1, is used as the driving speed of the vehicle 11 in the very low speed mode. Accordingly, even when the brake pedal 31 is depressed during execution of the very low speed mode and the rotation of the wheels 12 is stopped, excessive torque fluctuations of the driving motor 13 may be prevented, and the driving motor 13 may be controlled without making the driver feel uncomfortable. Here, FIGS. 6A to 6C are images illustrating the rotation status of the driving motor 13 when braking control is performed on the vehicle 11 in the very low speed mode. Note that the rotation direction of each rotation element is indicated using an arrow in FIGS. 6A to 6C.

As illustrated in FIG. 6A, the driving motor 13 and the wheels 12 are coupled to each other via the power transmission path 18 including a gear mechanism such as the differential mechanism 16. In the above-described very low speed mode, the driving motor 13 is rotated in the normal rotation direction, thereby transmitting rotational force from a drive gear 50 to a driven gear 51, which form part of the differential mechanism 16, and allowing the wheels 12 coupled to the driven gear 51 to rotate in the forward direction. Next, as illustrated in FIG. 6B, if the brake pedal 31 is depressed to stop the rotation of the wheels 12, the rotation of the driven gear 51 coupled to the wheels 12 also stops. At this time, although the target torque of the driving motor 13 is controlled to zero, the rotor 14 of the driving motor 13 continues its rotation in the normal rotation direction due to inertial force.

In short, after the rotation of the wheels 12 is stopped by the brake 30, as illustrated in FIG. 6B, the drive gear 50 and the rotor 14 coupled thereto rotate in the normal rotation direction at a certain rotation angle so as to bring backlash, which is play of the power transmission path 18, to one side. After that, because the drive gear 50 in rotation is bounced off by the driven gear 51 in stop, as illustrated in FIG. 6C, the drive gear 50 and the rotor 14 coupled thereto rotate in the reverse rotation direction at a certain rotation angle so as to bring backlash of the power transmission path 18 to the other side. As described above, when the rotation of the wheels 12 is stopped by the brake 30, the rotor 14 of the driving motor 13 rotates, for a moment, in the reverse rotation direction at a certain rotation angle. Thus, the sensor actual vehicle speed V1, which is calculated on the basis of the rotation angle of the rotor 14, is calculated, for a moment, in the reverse direction.

As described above, when the rotation of the wheels 12 is stopped by the brake 30, the sensor actual vehicle speed V1 is calculated, for a moment, in the reverse direction. In the very low speed mode, to prevent the vehicle 11 from sliding down, the target powering torque of the driving motor 13 is increased in response to detection of reverse vehicle movement. That is, if the sensor actual vehicle speed V1 is used in the very low speed mode, the target powering torque of the driving motor 13 is momentarily increased in response to erroneous determination of reverse vehicle movement. This may sometimes generate excessive torque fluctuations of the driving motor 13. The vehicle control apparatus 10 of the present embodiment uses the control actual vehicle speed V2 in the very low speed mode, thereby avoiding erroneous determination of reverse vehicle movement in the very low speed mode.

Very Low Speed Mode (Timing Chart)

Figure 7:
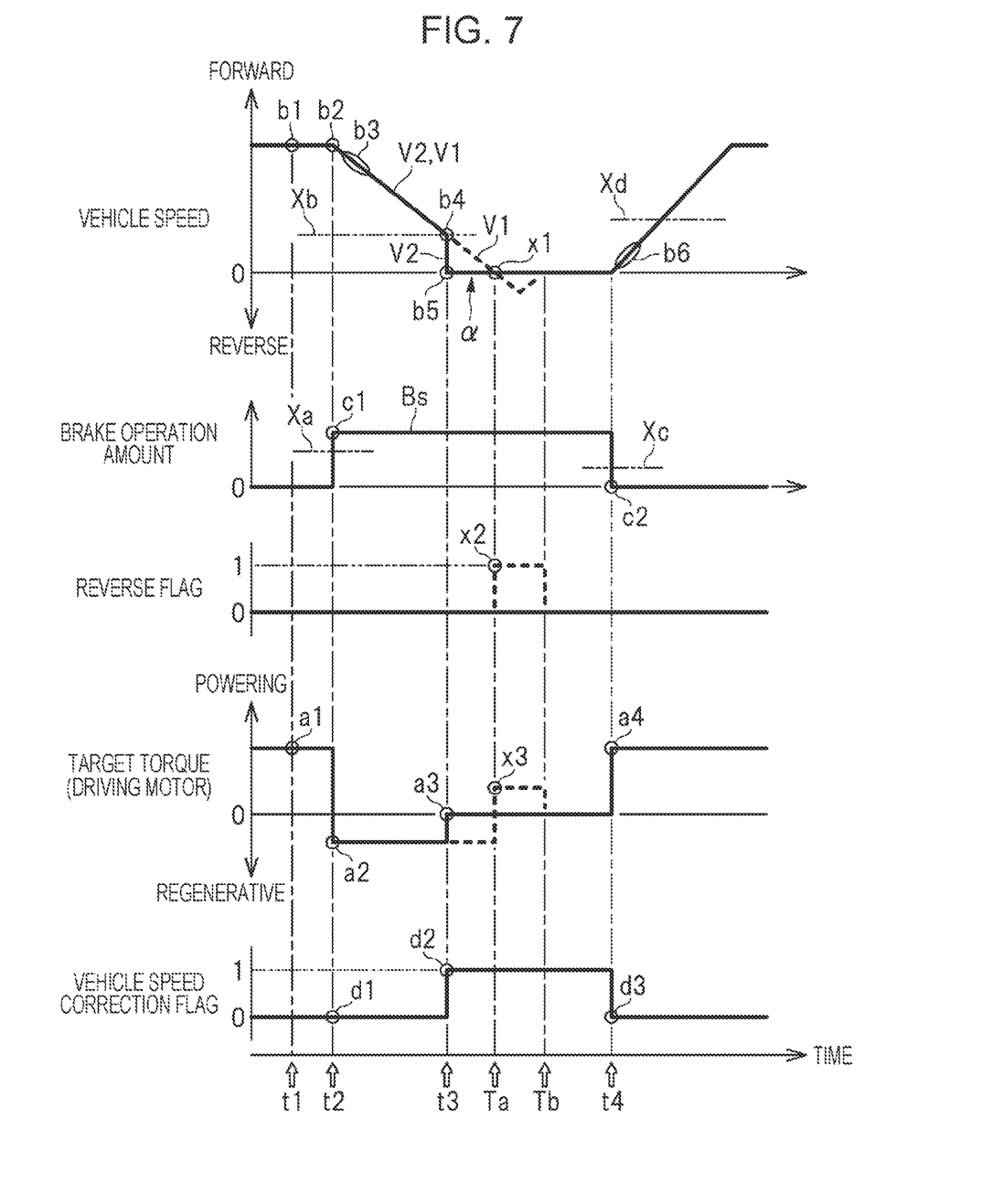
FIG. 7 is a timing chart illustrating an example of the execution status of the very low speed mode.

Hereinafter, the execution status of the very low speed mode will be described along a timing chart. FIG. 7 is a timing chart illustrating an example of the execution status of the very low speed mode. FIG. 7 illustrates the status where, during execution of the very low speed mode, the brake pedal 31 is depressed to stop the vehicle 11, and then the brake pedal 31 is released to restart the vehicle 11.

As indicated at time t1 in FIG. 7, during execution of the very low speed mode, the target torque of the driving motor 13 is set to powering (reference symbol a1), and the vehicle 11 slowly moves forward while maintaining the driving speed constant (reference symbol b1). After that, as indicated at time t2, when the driver steps on the brake pedal 31, the brake operation amount Bs exceeds the threshold Xa (reference symbol c1), and the target torque of the driving motor 13 is set to regenerative (reference symbol a2). At this time t2, because the sensor actual vehicle speed V1 exceeds the threshold Xb (reference symbol b2), the vehicle speed correction flag is set to "0" (reference symbol d1), and the sensor actual vehicle speed V1 is set as the control actual vehicle speed V2 (reference symbol b3).

Next, as indicated at time t3, when the sensor actual vehicle speed V1 decreases and falls below the threshold Xb (reference symbol b4), the vehicle speed correction flag is set to "1" (reference symbol d2). In this manner, in response to setting of the vehicle speed correction flag to "1", zero (0 km/h) is set as the control actual vehicle speed V2 (reference symbol b5). In this manner, because the control actual vehicle speed V2 becomes zero, the target torque of the driving motor 13 is also set to zero (reference symbol a3). After that, as indicated at time t4, when the driver releases the brake pedal 31, the brake operation amount Bs falls below the threshold Xc (reference symbol c2), and the target torque of the driving motor 13 is set to powering (reference symbol a4). Because the brake operation amount Bs falls below the threshold Xc, the vehicle speed correction flag is set to "0" (reference symbol d3), and the sensor actual vehicle speed V1 is set as the control actual vehicle speed V2 (reference symbol b6).

As described above, even when the vehicle 11 is stopped by a brake operation, the control actual vehicle speed V2 used in the very low speed mode is maintained at zero (0 km/h) immediately before a vehicle stop, as indicated by arrow α. Accordingly, erroneous determination of reverse vehicle movement in the very low speed mode may be avoided. The target torque of the driving motor 13 is not increased upon a vehicle stop, and the driving motor 13 may be appropriately controlled so as not to make the driver feel uncomfortable.

That is, if the sensor actual vehicle speed V1 is used in the very low speed mode, as indicated at time Ta, the sensor actual vehicle speed V1 goes beyond zero and changes in the reverse direction (reference symbol x1). Thus, the reverse flag is set to "1" (reference symbol x2), and the target torque of the driving motor 13 is set to powering (reference symbol x3). The status where the target torque of the driving motor 13 is set to powering is maintained until the sensor actual vehicle speed V1 converges to zero, as indicated at time Tb. In short, with the use of the control actual vehicle speed V2 instead of the sensor actual vehicle speed V1 in the very low speed mode, erroneous determination of reverse vehicle movement or torque fluctuations of the driving motor 13, which are indicated by broken line in FIG. 7, may be avoided.

The disclosure is not limited to the above-described embodiment, and various modifications may be made without departing from the gist thereof. Although an electronic vehicle that includes the driving motor 13 as a power source has been described above as the vehicle 11 including the vehicle control apparatus 10, the disclosure is not limited thereto, and the vehicle 11 may be a hybrid electric vehicle including the driving motor 13 and an engine as power sources. Although the differential mechanism 16, which is a gear mechanism, is provided in the power transmission path 18 which couples the driving motor 13 and the wheels 12 in the above description, there may be other possible cases, and other gear mechanisms may be provided in the power transmission path 18. In addition, a gear mechanism may be omitted from the power transmission path 18 which couples the driving motor 13 and the wheels 12. Even if a gear mechanism is omitted from the power transmission path 18 as above, because there is backlash in the power transmission path 18 including a plurality of mechanical elements, the disclosure is effectively applicable.

Although the thresholds Xa and Xc are set to different values in the example illustrated in FIG. 3, there may be other possible cases, and the thresholds Xa and Xc may be set to the same value. Note that the threshold Xa compared with the brake operation amount Bs may simply be a value based on which depressing of the brake pedal 31 is detectable, and the threshold Xc compared with the brake operation amount Bs may simply be a value based on which releasing of the brake pedal 31 is detectable. Although the thresholds Xb and Xd are set to different values in the example illustrated in FIG. 3, there may be other possible cases, and the thresholds Xb and Xd may be set to the same value. Note that the threshold Xb compared with the sensor actual vehicle speed V1 may simply be a value based on which it is possible to detect that the vehicle 11 is immediately before stopping, and the threshold Xd compared with the sensor actual vehicle speed V1 may simply be a value based on which it is possible to detect that the vehicle 11 is not immediately before stopping.

Effects of Disclosure

According to the disclosure, zero is set as a second vehicle speed in the case where a brake operation amount exceeds a threshold and a first vehicle speed falls below a threshold during execution of a constant speed driving mode. Accordingly, erroneous determination of reverse vehicle movement may be avoided.

The controller 40 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 40 including the vehicle speed calculator 45, the vehicle speed setter 46, and the motor controller 47. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle control apparatus to be applied to a vehicle, the vehicle control apparatus being configured to control a driving motor of the vehicle coupled to at least one wheel of the vehicle, the vehicle control apparatus comprising:
a motor controller configured to control the driving motor upon executing a constant speed driving mode of maintaining a driving speed of the vehicle constant in a very low speed range;
a vehicle speed calculator configured to calculate a first vehicle speed based on a rotation angle of the driving motor, the first vehicle speed being the driving speed of the vehicle; and
a vehicle speed setter configured to set, as the driving speed of the vehicle used in the constant speed driving mode, a second vehicle speed based on the first vehicle speed and a brake operation amount,
wherein the vehicle speed setter is configured to
set zero as the second vehicle speed in a case where the brake operation amount exceeds a brake operation threshold and the first vehicle speed falls below a vehicle speed threshold during execution of the constant speed driving mode, and
set the first vehicle speed as the second vehicle speed in a case where the brake operation amount is less than or equal to the brake operation threshold or the first vehicle speed is greater than or equal to the vehicle speed threshold during execution of the constant speed driving mode.

2. The vehicle control apparatus according to claim 1, wherein, the motor controller is configured to set, in a case where the second vehicle speed changes from moving forward to moving reverse during execution of the constant speed driving mode, a target torque of the driving motor to a value larger than a latest value in a forward direction and in a powering direction.

3. The vehicle control apparatus according to claim 1, wherein the at least one wheel and the driving motor are coupled to each other via a gear mechanism.

4. The vehicle control apparatus according to claim 2, wherein the at least one wheel and the driving motor are coupled to each other via a gear mechanism.

5. A vehicle control apparatus to be applied to a vehicle, the vehicle control apparatus being configured to control a driving motor of the vehicle coupled to at least one wheel of the vehicle, the vehicle control apparatus comprising:
circuitry configured to
control the driving motor upon executing a constant speed driving mode of maintaining a driving speed of the vehicle constant in a very low speed range, calculate a first vehicle speed based on a rotation angle of the driving motor, the first vehicle speed being the driving speed of the vehicle, and set, as the driving speed of the vehicle used in the constant speed driving mode, a second vehicle speed based on the first vehicle speed and a brake operation amount, wherein the circuitry is configured to set zero as the second vehicle speed in a case where the brake operation amount exceeds a brake operation threshold and the first vehicle speed falls below a vehicle speed threshold during execution of the constant speed driving mode, and set the first vehicle speed as the second vehicle speed in a case where the brake operation amount is less than or equal to the brake operation threshold or the first vehicle speed is greater than or equal to the vehicle speed threshold during execution of the constant speed driving mode.

* * * * *